Nov. 24, 1931.  A. BACHLE  1,832,958
CAM SHAFT DRIVE MECHANISM
Filed Feb. 13, 1928   2 Sheets-Sheet 1
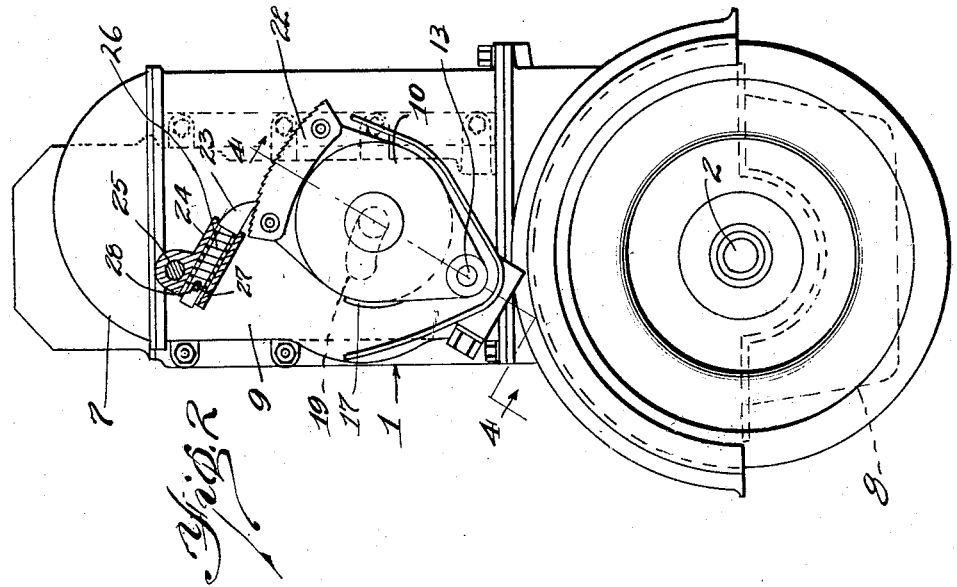
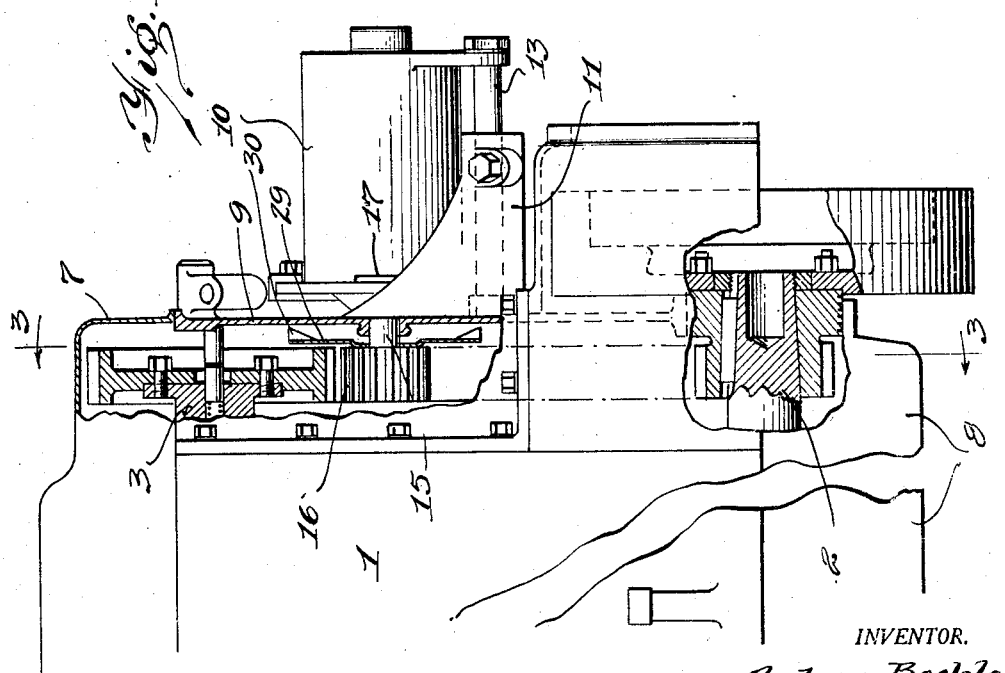
INVENTOR.
Andrew Bachle
BY
ATTORNEYS Nov. 24, 1931.   A. BACHLE   1,832,958
CAM SHAFT DRIVE MECHANISM
Filed Feb. 13, 1928   2 Sheets-Sheet 2
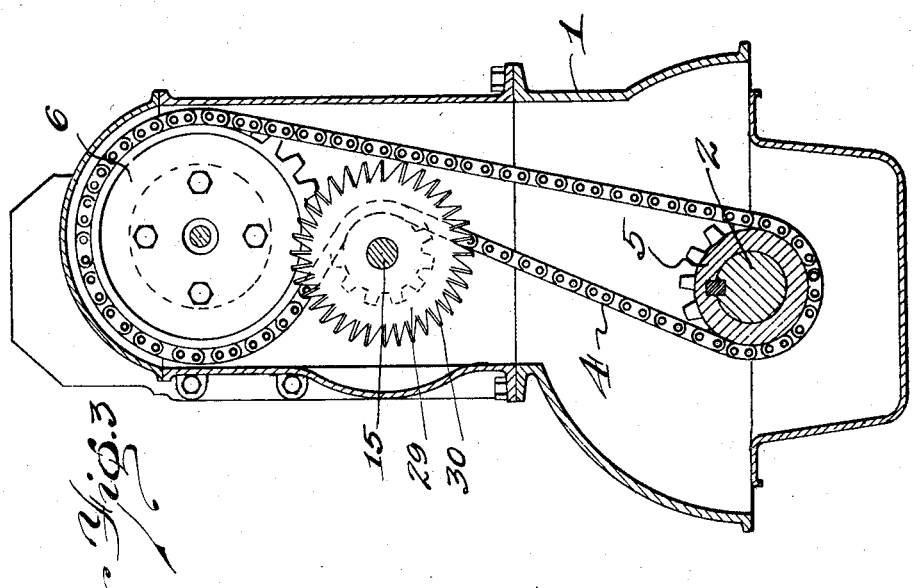
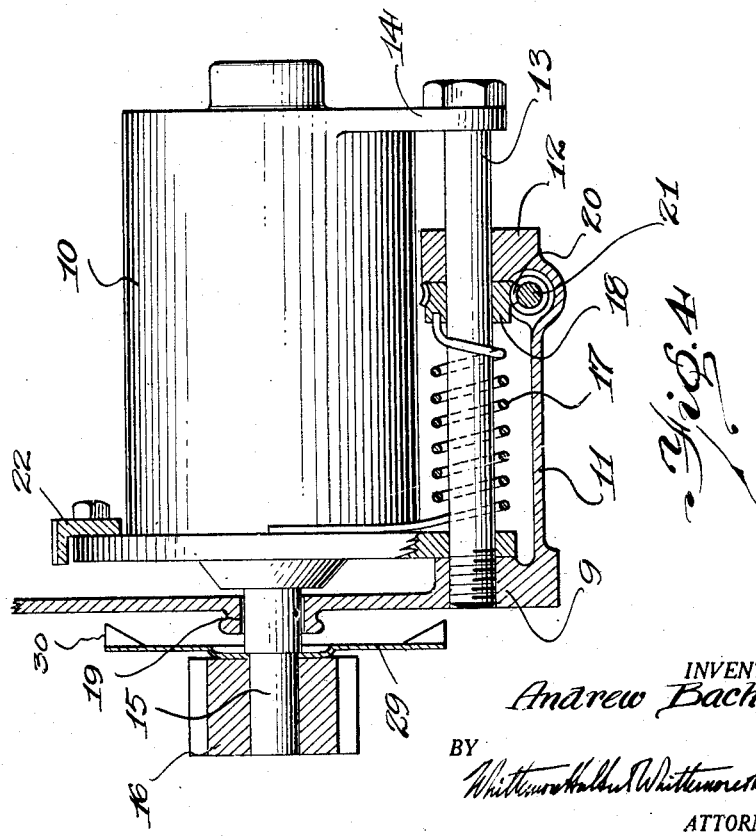
INVENTOR.
Andrew Bachle
BY
ATTORNEYS Patented Nov. 24, 1931

1,832,958

UNITED STATES PATENT OFFICE

ANDREW BACHLE, OF DETROIT, MICHIGAN

CAM SHAFT DRIVE MECHANISM

Application filed February 13, 1928. Serial No. 254,116.

The invention relates to internal combustion engines and refers more particularly to the mechanism for driving the cam shaft of an engine from the crank shaft. One of the objects of the invention is to so arrange the mechanism that the linear member for driving the cam shaft from the crank shaft also drives the generator and is maintained taut by this generator. Other objects are to so construct the mechanism that the generator is normally held in a position maintaining the linear member taut, but is allowed to move in a direction partially relieving the tautness of the linear member so that it will not be subjected to undue stress caused, for example, by contraction; to so construct the generator that it will force air into the chamber containing the mechanism and also the engine crank case communicating with this chamber; and to so construct the generator that it prevents oil from passing outwardly through the slot in the chamber wall providing for movement of the generator. With these as well as other objects in view, the invention resides in the novel features of construction and combinations and arrangements of parts as more fully hereinafter set forth.

In the drawings:—

Figure 1 is a sectional side elevation of an internal combustion engine, embodying my invention;

Figure 2 is a front elevation thereof;

Figure 3 is a cross section on the line 3—3 of Figure 1;

Figure 4 is an elevation, partly in section, on the line 4—4 of Figure 2.

1 is the internal combustion engine having the crank shaft 2 and the cam shaft 3, the latter in the present instance being an overhead cam shaft. For driving the cam shaft from the crank shaft, I have provided the endless linear member 4 which is in the nature of a sprocket chain extending around the sprockets 5 and 6 secured, respectively, to the front ends of the crank shaft and cam shaft. The driving mechanism is enclosed by the engine cover 7 and crank case 8 and the case 9 removably secured to the engine, the arrangement being such that the driving mechanism is housed within a chamber formed at the front end of the engine and communicating with the crank case.

10 is the generator which is so arranged that it is driven by the sprocket chain 4 and at the same time automatically maintains this chain taut to absorb wear or other looseness. This generator is movably mounted upon the case 9 and, as shown, the case has the forwardly extending base portion 11, which is provided at its front end with the upstanding lug 12. 13 is the shaft for mounting the generator upon the case, this shaft being in the nature of a bolt which extends through the lug 12 and is threaded into the case 9, the generator having depending portions 14 at the ends of its casing, which are journaled upon the shaft. 15 is the shaft of the generator rotor and 16 is the sprocket secured upon this shaft and engaging the sprocket chain 4. For automatically maintaining the sprocket chain taut, I have provided the coil spring 17 which encircles the shaft 13 and has one end engaging the generator casing and the other end engaging the collar 18, the case 9 being provided with the arcuate slot 19 concentric with the shaft 13 and through which the generator shaft 15 extends. To vary the strength of the coil spring 17, the collar 18 is made to be rotatably adjusted and in the present instance this collar is connected to and preferably made integral with the worm wheel 20, which meshes with and is turned by the worm 21, the latter being rotatably adjustably mounted in the base 11 of the case 9.

It is necessary at times to normally prevent the generator from returning when the sprocket chain exerts a greater force than that of the torsional spring 17. I, therefore, provide means for normally holding the generator in its adjusted position. This means, as shown, comprises the ratchet 22 and the dog 23, the ratchet being secured to the generator casing and having an arcuate series of teeth concentric with the generator mounting shaft 13 and the dog having a nose engageable with these teeth and being mounted in the support 24, which is pivotally mounted at 25 upon the case 9. The dog is longitudinally movable relative to its support and it is yieldably held in its outermost or forwardmost position by means of the coil spring 26, which extends within the shank of the dog and abuts the pin 27 extending transversely through the support 24 and the longitudinally extending slots 28 in the shank. This construction also provides for relieving the sprocket chain 4 from undue stress which might otherwise occur, for example, by contraction of its parts, inasmuch as the dog 23 may move in the opposite or rearward direction to a limited extent when sufficient pressure is exerted by the sprocket chain upon the generator. This rearward movement of the dog is limited by the pin 27 coming into contact with the opposite ends of the slots 28 in the shank of the dog.

It is very important to prevent oil from passing outwardly through the arcuate slot 19 and I have, therefore, provided upon the generator shaft 15 and inside the case 9 and between this case and the sprocket 16 the disk 29 which is rotatable with the generator shaft. This disk has a diameter greater than the length of the slot and has at its outer periphery the vanes 30 which are so arranged that upon rotation of the generator shaft they act to displace air outwardly in the same manner as a centrifugal pump so that oil is prevented from passing between the disk and the case and then outwardly through the arcuate slot. Furthermore, this construction is such that air is drawn through the arcuate slot and forced into the chamber at the front end of the engine and then rearwardly of the crank case to be discharged through a suitable breather at its rear end. It will thus be seen that oil is prevented from passing outwardly through the slot through which the generator shaft extends and further that crank case ventilation is provided for.

What I claim as my invention is:

1. In an internal combustion engine, the combination with a crank shaft, a cam shaft, an endless linear member for driving said cam shaft from said crank shaft, and a generator, of means for yieldably forcing said generator against said linear member for automatically maintaining said linear member taut, and means for normally holding said generator from movement in the opposite direction.

2. In an internal combustion engine, the combination with a crank shaft, a cam shaft, an endless linear member for driving said cam shaft from said crank shaft, and a generator, of means for yieldably forcing said generator against said linear member for automatically retaining said linear member taut, means including a movable dog for normally holding said generator from movement in the opposite direction, and means engageable with said dog for positively limiting the movement of said generator in the opposite direction.

3. In an internal combustion engine, the combination with a crank shaft, a cam shaft, an endless chain, and a generator having a rotor engaging and driven by said chain, of means for movably mounting said generator, means for yieldably moving said generator to force said rotor against said chain and maintain the latter taut, and means for normally holding said generator from movement in the opposite direction.

4. In an internal combustion engine, the combination with a crank shaft, a cam shaft, an endless chain for driving said cam shaft from said crank shaft, and a generator engaging and driven by said chain of a pivotal mounting for said generator, means for yieldably forcing said generator in one direction to a position engaging said chain and maintaining the latter taut, and means for normally holding said generator in its adjusted position but providing for relatively small movement in the opposite direction to relieve said chain from undue stress.

5. In an internal combustion engine, the combination with a crank shaft, a cam shaft, an endless chain, and a generator engaging and driven by said chain of a pivotal mounting for said generator, means for yieldably swinging said generator about its pivot in one direction to position engaging said chain and maintaining the same taut, a toothed member upon and movable with said generator, a longitudinally movable dog engageable with said toothed member and a spring engageable with said dog to normally hold the same in a predetermined position whereby said generator is normally held in its adjusted position, and means engageable with said dog to limit its movement in the opposite direction.

In testimony whereof I affix my signature.

ANDREW BACHLE.